United States Patent

[11] 3,572,977

[72] Inventors Manuel Sanz
Grand-Lancy
Rene Weber, Geneva, Switzerland
[21] Appl. No. 849,078
[22] Filed Aug. 11, 1969
[45] Patented Mar. 30, 1971
[73] Assignee Micromedic Systems, Inc.
Philadelphia, Pa.
[32] Priority Aug. 16, 1968
[33] Switzerland
[31] 12,399/68

[54] DISTRIBUTOR PUMP
5 Claims, 5 Drawing Figs.
[52] U.S. Cl. .................................................. 417/360, 417/519
[51] Int. Cl. ......................................................F04b 19/22, F04b 7/00

[50] Field of Search............................................ 417/510, 518, 519, 360, 454

[56] References Cited
UNITED STATES PATENTS
| | | | |
|---|---|---|---|
| 1,774,662 | 9/1930 | Parks............................ | 417/519X |
| 3,447,479 | 6/1969 | Rosenberg..................... | 417/360X |

*Primary Examiner*—Robert M. Walker
*Attorneys*—Gerry J. Elman, George W. F. Simmons and Arthur R. Eglington

ABSTRACT: To permit easy dismantling and replacement, a distributor pump comprises a piston syringe, a distribution valve having a rotary frontal valve element, and a driving member for said element, all arranged in series along a common axis coinciding with the axis of movement of the piston and constituting the axis of rotation of the valve element.

Patented March 30, 1971

DISTRIBUTOR PUMP

The present invention relates to a distributor pump intended to be mounted in a frame of an apparatus and comprising a piston syringe, a distribution valve having a fixed seat and a rotary frontal valve element, a driving member for said element, securing means permitting the whole to be made fast with the frame and locking means to prevent the pump from becoming accidentally detached from the frame.

Piston syringes associated with distribution valves having rotative frontal valve elements are encountered in certain apparatus where a fluid is required to be aspirated, during a first stroke of the piston through a first pipe, and then during the subsequent stroke of the piston through a second pipe, the switch from the first to the second pipe being effected by the rotary valve of which the valve element performs a rotation synchronized with the reciprocating movement of the piston. In most cases the valve has a rotary frontal valve element, by which it is to be understood that the operative surface of the element which cooperates with the operative surface of the seat is perpendicular to the axis of rotation of the latter, such operative surface carrying link channels capable of putting into communication peripheral orifices which are provided on the operative surface of the seat and which are arranged in a circle around this axis of rotation with a central orifice centered on this axis; the central orifice constitutes the end of a principal channel which communicates with the part of the syringe situated ahead of the piston, while the peripheral orifices constitute the ends of auxiliary channels which moreover open out on to the lateral surface of the seat where they are connected to pipes, generally flexible, conveying fluid to be moved by the piston.

One example of such pumps and valves are distributor cum metering apparatus used in chemical analytical laboratories, and in particular those which are intended to divide up into metered samples, substances to be analyzed or to be subjected to a reaction. Such distributing cum metering apparatus are used in particular in biochemical laboratories where they are especially used for hematological analyses. The pumps which are fitted to such apparatus and the associated distribution valves require frequent cleaning and those which are used in biochemical analytical apparatus require sterilization. With the known apparatus, this cleaning and sterilization requires a separate dismantling firstly of the pump, and secondly of the valve and also requires the reassembly and putting back into position of these members. The necessity for this dismantling and reassembly interrupts the rate of utilization of the apparatus and becomes the source of accidents due both to errors of assembly and to errors in matching parts; apart from the risks of breakage, there are also the disadvantages associated with defects in the fluidtight sealing caused by ill-matched parts.

The distributor pump of the present invention obviates the disadvantages of the known apparatus and enables easy and rapid removal and replacement, and consequently the exchange, both of the syringe itself and the distribution valve associated with it. According to the invention, the syringe, the valve seat, the valve element and the driving member are arranged in series one after the other, along a common axis coinciding with the axis of movement of the piston and constituting the axis of rotation of the valve element and are maintained assembled in a common mounting comprising a body and a cap, said body having at its base an opening for the passage of the piston rod and said cap being provided at its upper part with an opening for the passage of the end of said driving member, the securing means comprising a pair of radial studs fixed to said cap and arranged symmetrically at the ends of a straight line perpendicular to the common axis, said studs being adapted to engage, when the pump is fixed to the frame, in a pair of right-angled slots provided at diametrically opposed positions in a ring pivotally mounted on the frame by means of two trunnions arranged on a diameter orthogonal to that of the slots, whereby said ring constitutes a Cardan ring to which the common mounting is attached to the bayonet fitting formed by the studs and right-angled slots, the locking means comprising a longitudinal slot formed in the lateral external wall of the cap and adapted to cooperate, when the pump is fixed to the frame, with a radial pin sliding within one of the trunnions and subjected to the action of a resilient member tending to cause it to project towards the said common axis, the pin preventing rotation of the cap relative to the ring, and means for effecting, when desired, release of the rod from the slot when the pump is to be detached from the frame.

The accompanying drawing represents, by way of example, one form of embodiment of a pump according to the invention.

Figure 1:
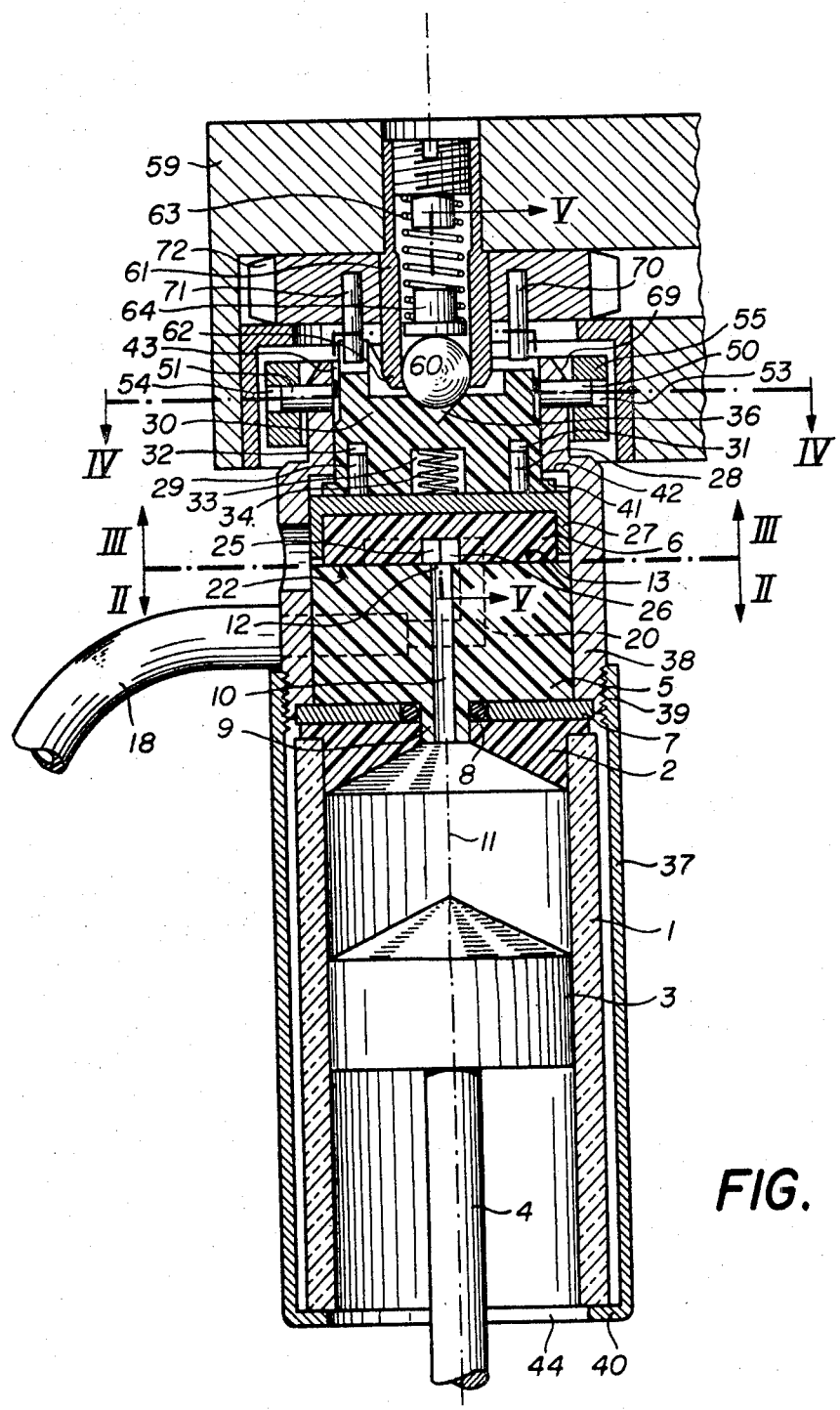
FIG. 1 is a longitudinal section.
Figure 2:
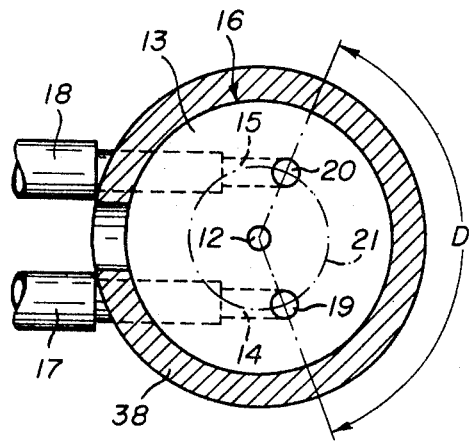
FIGS. 2 and 3 are frontal views along the lines II–II, and III–III, respectively of FIG. 1, of two particular members.
Figure 3:
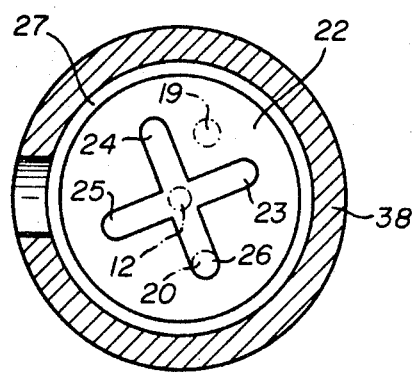

The distributor pump shown in FIG. 1 comprises a syringe constituted by a cylinder 1 closed at its upper end by a plug 2 and a piston 3 secured to one end of a rod 4. The plug 2 is surmounted by a distribution valve comprising a seat 5 with which cooperates a rotary valve element 6. A washer 7 and a sealing ring 8 are interposed between the plug 2 and the seat 5 and the latter terminates in a connector 9 which extends through the plug 2. A principal channel 10, coaxial with the axis 11 along which the piston 3 moves, traverses seat 5 and connects the end of the connector 9, i.e. the base of the syringe, to a central orifice 12 provided in the operative surface 13 of the seat. The latter is in addition formed with two auxiliary channels 14 and 15 which open out on to its lateral wall 16, and which, by passing at the side of the principal channel 10, connect the flexible ducts 17 and 18 with peripheral orifices 19 and 20 provided on the operative surface 13. These peripheral orifices lie on a circle 21 (FIG. 2) concentric with the central orifice 12 and for reasons which will appear below, their angular distance D amounts to three-eighths of a circle, i.e. 135°. The valve element 6 is formed on its operative face 22 with four link channels 23, 24, 25, 26 arranged in star form at 90° to one another and adapted to put orifice 12 of seat 5 in communication with one or the other of the peripheral orifices 19, 20. The value element 6 which is preferably made of a hard plastic material, for example Kel-F (Registered Trade Mark for polytetra-fluoroethylene) is force-fitted into a socket 27 carrying two pins 28, 29; the latter extend into two corresponding sockets 31, 32 provided in a member 30 constituting a driving member. The valve element 6 is thus angularly rigid with member 30. The latter has, at its lower end, a mounting 33 in which is lodged a spring 34 and, at its upper end, a crenelated crown 35 surrounding an axial cavity 36.

The cylinder 1, plug 2, washer 7, joint 8, seat 5, valve element 6 and driving member 30 are held in a mounting comprising a body 37 and a cap 38 which are assembled by screwing by means of a screw thread 39: the lower end of the cylinder 1 abuts against the base 40 of the body 37, the base being formed with an opening 44 for the passage of the rod 4 of piston 3, and the driving member 30 is held by a shoulder 41 cooperating with an internal shoulder 42 provided in cap 38 in order to prevent the driving member from escaping through the opening 43 in the cap. The only elements which are accessible through this opening are the crenelated crown 35 and the axial cavity 36. The effect of spring 34 is to exert on valve element 6 an axial force pressing the latter against seat 5 in order to ensure fluidtightness between these members.

Figure 4:
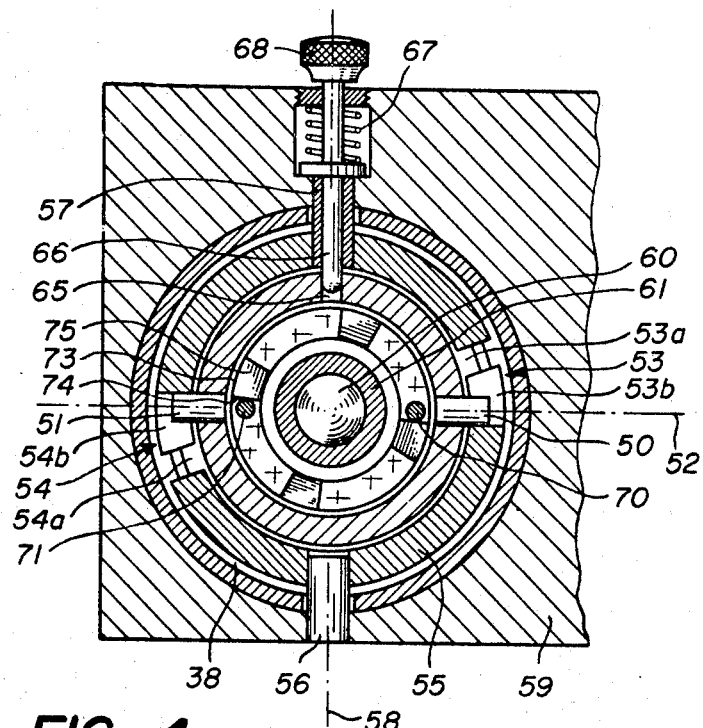
FIG. 4 is a cross section along the line IV–IV of FIG. 1.

The pump further comprises securing means constituted by two radial studs 50, 51 (FIG. 4) located on opposite sides of the upper end of the cap 38 along a transverse axis 52 and cooperating with slots 53, 54 at right angles formed at diametrically opposed positions in a ring 55. The latter itself pivots around two radial trunnions 56, 57 arranged along a transverse orthogonal axis 58 on the diameter on which are placed the slots 53, 54. The trunnions 56, 57 are themselves fitted in the frame 59 of the apparatus. This arrangement thus provides a Cardan joint (due to the pivoting ring 55) having a bayonet fitting (due to studs 50, 51 and slots 53, 54). When the pump is in position, the axial cavity 36 cooperates with a resilient axially acting push member having a spherical head constituted by a ball 60 set into a tubular socket 61, the lower edge 62 of which is constricted to prevent the ball from escaping. A spring 63 causes the latter, through the intermediary of an abutment 64, to project out of socket 61 and to urge it with force against the bottom of the axial cavity 36, thereby urging valve element 6 against seat 5. This push member assists in ensuring, when the pump is in position, fluidtightness between the seat and the element of the valve by pressing them one against the other more strongly than the spring 34 (for this reason, in FIG. 1, shoulder 41 is spacially separated from shoulder 42). When piston 3 transports the fluid, there may develop in the latter, especially when a liquid, high pressures which may induce leaks between the seat and the valve element, despite the presence of spring 34 which is dimensioned only to ensure fluidtightness when the pump is detached from the frame, i.e. when piston 3 is not in operation.

The base of socket 3 may advantageously be given a conical form, so that resilient push member also ensures alignment of the assembly.

Finally the apparatus comprises locking means for preventing, upon accidental rotation of the mounting constituted by body 37 and cap 38, the radial studs 50, 51 from becoming disengaged from the right-angled slots 53, 54. These locking means comprise a longitudinal slot 65 (FIG. 4) with which cooperates a locking pin 66 which extends through one of the trunnions, in this case trunnion 57, and which is subjected to the action of spring 67 which causes it to project towards the interior of ring 55. It is only when the end of this pin is voluntarily retracted, by pulling on a button 68, that the mounting can be released to rotate in such a way as to disengage the radial studs 50, 51 from the right-angled slots 53, 54 thus enabling the distributor pump itself to be removed. In order to avoid the necessity of manipulating this button 68 when the pump is being mounted in position, the upper end of cap 38 comprises a conical part 69 the inclination of which is so chosen that the pin 66 can be pushed back when studs 50, 51 are engaged in the longitudinal portions 53a, 54a of slots 53, 54 and that its end will fall by itself into slot 65 when these studs abut against the base of the peripheral portions 53b, 54b of these slots.

Figure 5:
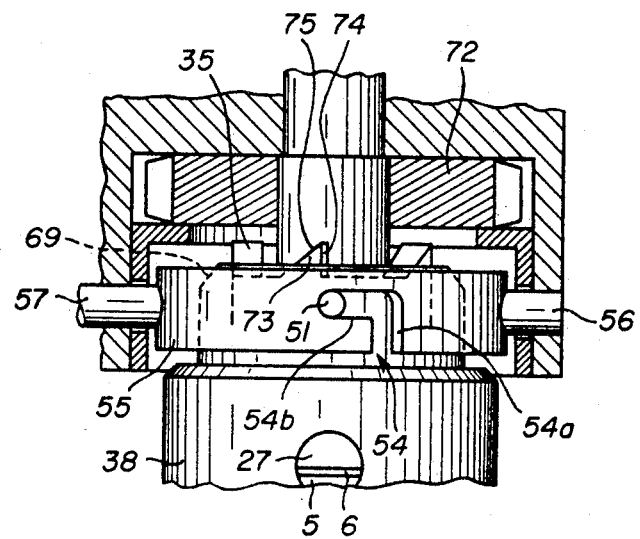
FIG. 5 is a side view, in partial section along the line V–V of FIG. 1.

The crenelated crown 35 of the driving member 30 is arranged so that its merlons cooperate with driving pins 70, 71 rigid with a driving wheel 72 which is itself put into rotation by means not shown. In order to prevent the tips of the merlons from abutting against the ends of pins 70, 71, when the pump is being mounted in position, it is advisable for each of them to have a straight edge and an oblique edge giving them a triangular form, so that the crenelated crown has a saw-toothed profile. This is shown in FIG. 5 for the merlon 73 which has a straight edge 74 and an oblique edge 75. Naturally this requires that the direction of rotation of the driving wheel 72 shall always be the same and tends to urge the driving pins against the straight edges of the merlons.

It will be seen that in the distributor pump of the invention, the syringe and the distribution valve are assembled as a unit, which due to the particular securing means, locking means and driving means adopted, is easily put into position on the apparatus, removed from the latter and exchanged without any mechanical dismantling. This enables the unit to be sterilized as a whole and eliminates the necessity of subsequently reassembling members which have been individually sterilized; this is therefore a considerable advantage, since such reassembly is delicate and laborious if the benefit of sterilization is not to be lost.

The form of the link channels is immaterial. While the 90° cross arrangement which has been described for channels 23 to 26 implies a discontinuous rotation of the valve element 6, and thus of the driving wheel 72, a different arrangement, for example along an arc of a circle having the same diameter as the circle 21 of the peripheral orifices 19, 20 with a radial median arm (as in an anchor arrangement), would enable the valve element 6 to be given a continuous movement.

The securing by means of a Cardan ring leaves the pump free to oscillate, thereby avoiding jamming, forcing and operational irregularities which would result both from defects in alignment as well as from a nonrectilinear movement of piston rod 4. These are important advantages which render the distributor pump which has been described particularly useful in the case when it is required to manipulate with high precision very small quantities of fluid, as for example in microanalysis apparatus.

We claim:

1. A distributor pump for mounting in an apparatus frame comprising a piston syringe, a distribution valve having a rotary frontal valve element, a driving member for said element, securing means permitting the whole assembly to be rendered rigid with said frame, and locking means preventing said pump from becoming detached from said frame, the syringe, the valve seat, the valve element and the driving member arranged in series, one after the other, along a common axis coinciding with the axis of displacement of said piston and constituting the axis of rotation of the valve element and assembled in a common mounting comprising a body and a cap, said body being provided at its base with means defining an opening for the passage of the piston rod, said cap having at its apex walls defining an opening for the passage of the end of said driving member, the securing means comprising a pair of radial studs fixed to said cap and arranged symmetrically at the ends of a straight line perpendicular to said common axis, said studs being adapted to engage, when said pump is attached to said frame, with means defining a pair of right-angled slots provided at diametrically opposite positions in a ring pivotally mounted on said frame by means of two trunnions arranged on a diameter orthogonal to that of said slots, whereby said ring constitutes a Cardan ring to which said common mounting is attached by the bayonet joint formed by said studs and right-angled slots, said locking means comprising means defining a longitudinal slot provided in the lateral external wall of said cap and adapted to cooperate, when said pump is fixed to said frame, with a radial pin sliding in the inside of one of said trunnions and subjected to the action of a resilient member tending to cause it to project towards the said common axis, said pin preventing rotation of said cap relative to said ring, and further comprising means for effecting, when desired, release of said pin from said longitudinal slot when said pump is required to be detached from said frame.

2. Pump according to claim 1 comprising a resilient member inserted between the driving member and the valve element so as to exert an axial thrust urging the valve element against the seat to ensure fluidtightness of the valve when the pump is detached from the frame.

3. Pump according to claim 2 wherein the end of the driving member is provided with an axial cavity arranged to cooperate, when this pump is fixed to the said frame, with a resilient push member having a spherical head arranged in the frame, the resilient member exerting on the driving member an axial thrust capable of urging the driving member against the valve element so as to press the latter against the seat to ensure fluidtightness of the valve, and to maintain the radial studs applied against the edges of the right-angled slots.

4. Pump according to claim 1 wherein the driving member is angularly rigid with the valve element and is provided, at its end opposed to said element, with a crenelated crown capable of cooperating, when the pump is fixed to the frame, with a pair of driving pins rigid with a driving wheel carried by the frame whereby the driving wheel ensures rotation of the valve element.

5. Pump according to claim 4 wherein each merlon of the crenelated crown has a straight edge and an inclined edge which gives it a triangular form, whereby the crown has a sawtoothed profile to prevent said merlon from abutting accidentally against the ends of the driving lugs when the pump is being fitted on the frame.